US009577491B2

United States Patent
Jung et al.

(10) Patent No.: US 9,577,491 B2
(45) Date of Patent: Feb. 21, 2017

(54) STARTER MOTOR INCLUDING A REMOVABLE SOLENOID TOWER

(71) Applicant: REMY TECHNOLOGIES, L.L.C., Pendleton, IN (US)

(72) Inventors: Joo-Mok Jung, Fishers, IN (US); Jason Ryan, Noblesville, IN (US); Michael O'Neill, Fishers, IN (US); Matt Zider, Indianapolis, IN (US); Randall Masters, Yorktown, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 252 days.

(21) Appl. No.: 14/228,746

(22) Filed: Mar. 28, 2014

(65) Prior Publication Data
US 2015/0275836 A1   Oct. 1, 2015

(51) Int. Cl.
| | | |
|---|---|---|
| *F02N 15/00* | (2006.01) | |
| *F02N 15/04* | (2006.01) | |
| *F02N 15/06* | (2006.01) | |
| *H02K 7/116* | (2006.01) | |
| *F02N 11/00* | (2006.01) | |
| *H02K 7/14* | (2006.01) | |
| *H02K 7/10* | (2006.01) | |

(52) U.S. Cl.
CPC ............... *H02K 7/116* (2013.01); *F02N 11/00* (2013.01); *F02N 15/006* (2013.01); *H02K 7/14* (2013.01); *H02K 7/10* (2013.01); *Y10T 29/49009* (2015.01); *Y10T 74/13* (2015.01)

(58) Field of Classification Search
CPC ...... F02N 15/006; F02N 15/06; F02N 15/067; H02K 7/118; H02K 7/116; H02K 7/10
See application file for complete search history.

(56) References Cited

U.S. PATENT DOCUMENTS

| | | | | |
|---|---|---|---|---|
| 2,611,274 A | * | 9/1952 | Thorpe | ................. F02N 15/067 290/38 R |
| 3,020,771 A | * | 2/1962 | Redick | .................... F02N 15/06 74/7 A |

(Continued)

FOREIGN PATENT DOCUMENTS

| | | |
|---|---|---|
| JP | 666234 A | 3/1994 |
| JP | 2002235640 A | 8/2002 |
| JP | 2004270511 A | 9/2004 |

OTHER PUBLICATIONS

International Search Report and Written Opinion for PCT Application No. PCT/US2015/022359, dated Jun. 29, 2015, pp. 1-14.

*Primary Examiner* — William Kelleher
*Assistant Examiner* — Jake Cook
(74) *Attorney, Agent, or Firm* — Cantor Colburn LLP

(57) ABSTRACT

An electric machine includes a housing having an outer surface and an inner surface defining an interior zone. A solenoid mounting section is provided on the housing. The solenoid mounting section includes a shift lever opening that extends from the outer surface through the inner surface. A solenoid tower is mounted to the housing. The solenoid tower extends from a first end detachably coupled to the solenoid mounting section to a second end configured to receive a solenoid. The first end includes an opening that registers with the shift lever opening. At least one of the solenoid mounting section and the solenoid tower includes a seal.

16 Claims, 6 Drawing Sheets

(56) References Cited

U.S. PATENT DOCUMENTS 5,005,435 A * 4/1991 Sugiyama ............. F02N 15/067
                                                         277/636
6,612,191 B2   9/2003  Imanishi et al.
6,731,037 B1   5/2004  Kim et al.

* cited by examiner

STARTER MOTOR INCLUDING A
REMOVABLE SOLENOID TOWER

BACKGROUND OF THE INVENTION

Exemplary embodiments pertain to the art of electric machines and, more particularly to a starter motor having a removable solenoid tower.

Conventional internal combustion engines employ a motor starter to initialize motor rotation. Once initialized, combustion gases provide energy to maintain the motor rotation. Thus, once the engine begins normal operation, the motor starter must disengage. A typical motor starter includes an armature having a commutator and a plurality of windings arranged within a magnetic field. Electrical energy is passed through two or more brushes into the commutator. The electrical energy is transformed into magnetic energy that causes the armature to rotate. The rotation of the armature is imparted to a flywheel of the internal combustion engine.

The motor starter typically includes a gear that is selectively moved into engagement with the flywheel. A solenoid, mounted to the motor starter, selectively extends the gear into engagement with the flywheel upon activation of the starter motor. The gear is retracted upon cessation of power to the motor starter. In addition to the gear, the motor starter typically includes a clutch which ensures that the flywheel does not over spin the motor starter when the internal combustion engine starts.

BRIEF DESCRIPTION OF THE INVENTION

Disclosed is an electric machine including a housing having an outer surface and an inner surface defining an interior zone. A solenoid mounting section is provided on the housing. The solenoid mounting section includes a shift lever opening that extends from the outer surface through the inner surface. A solenoid tower is mounted to the housing. The solenoid tower extends from a first end detachably coupled to the solenoid mounting section to a second end configured to receive a solenoid. The first end includes an opening that registers with the shift lever opening. At least one of the solenoid mounting section and the solenoid tower includes a seal.

Also disclosed is a method of assembling an electric machine. The method includes installing a shift lever through a shift lever opening in a solenoid mounting section of a housing, providing a seal on a mating surface of one of the solenoid mounting section and a solenoid tower, and mounting the solenoid tower to the housing through the solenoid mounting section.

Further disclosed is a motor vehicle including a body having an engine compartment and a passenger compartment. An internal combustion engine is mounted in the engine compartment. The internal combustion engine includes a motor starter. The motor starter includes a housing having an outer surface and an inner surface that defines an interior zone. A solenoid mounting section is provided on the housing. The solenoid mounting section includes a shift lever opening that extends from the outer surface through the inner surface. A solenoid tower is mounted to the housing. The solenoid tower extends from a first end detachably coupled to the solenoid mounting section to a second end configured to receive a solenoid. The first end includes an opening that registers with the shift lever opening. At least one of the solenoid mounting section and the solenoid tower includes a seal.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
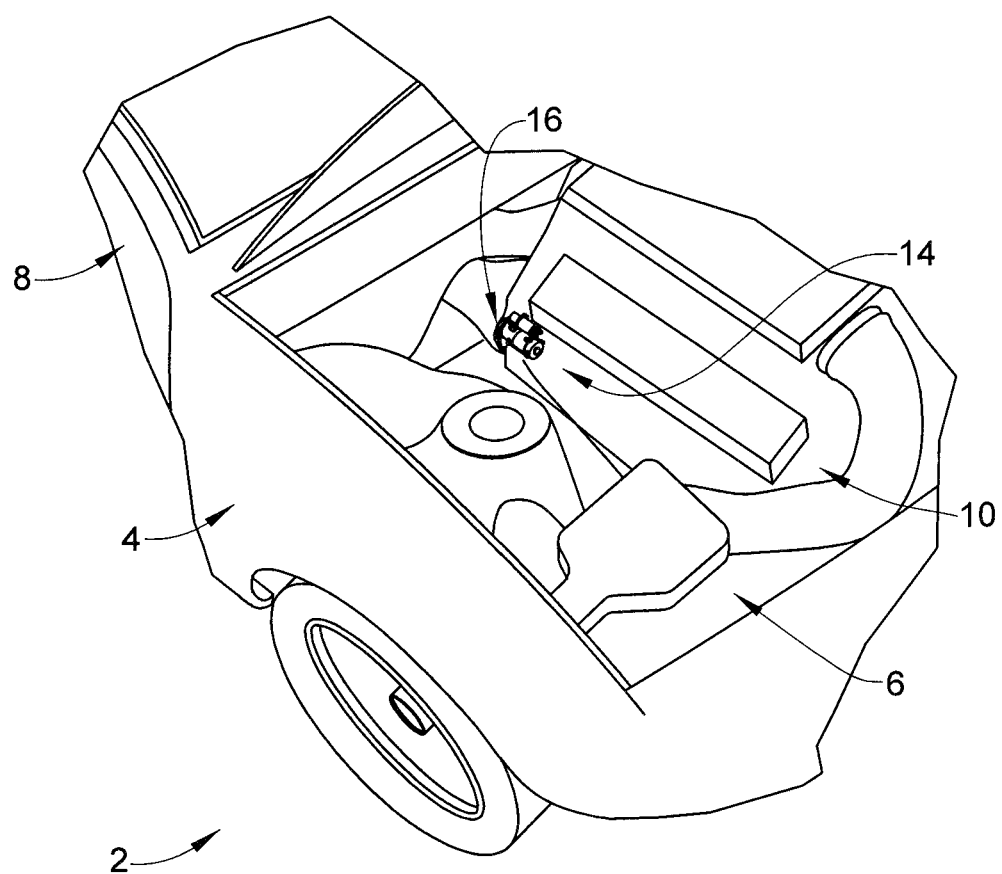
FIG. 1 depicts a partial perspective view of a motor vehicle including an internal combustion engine having a motor starter provided with a removable solenoid tower, in accordance with an exemplary embodiment.
Figure 2:
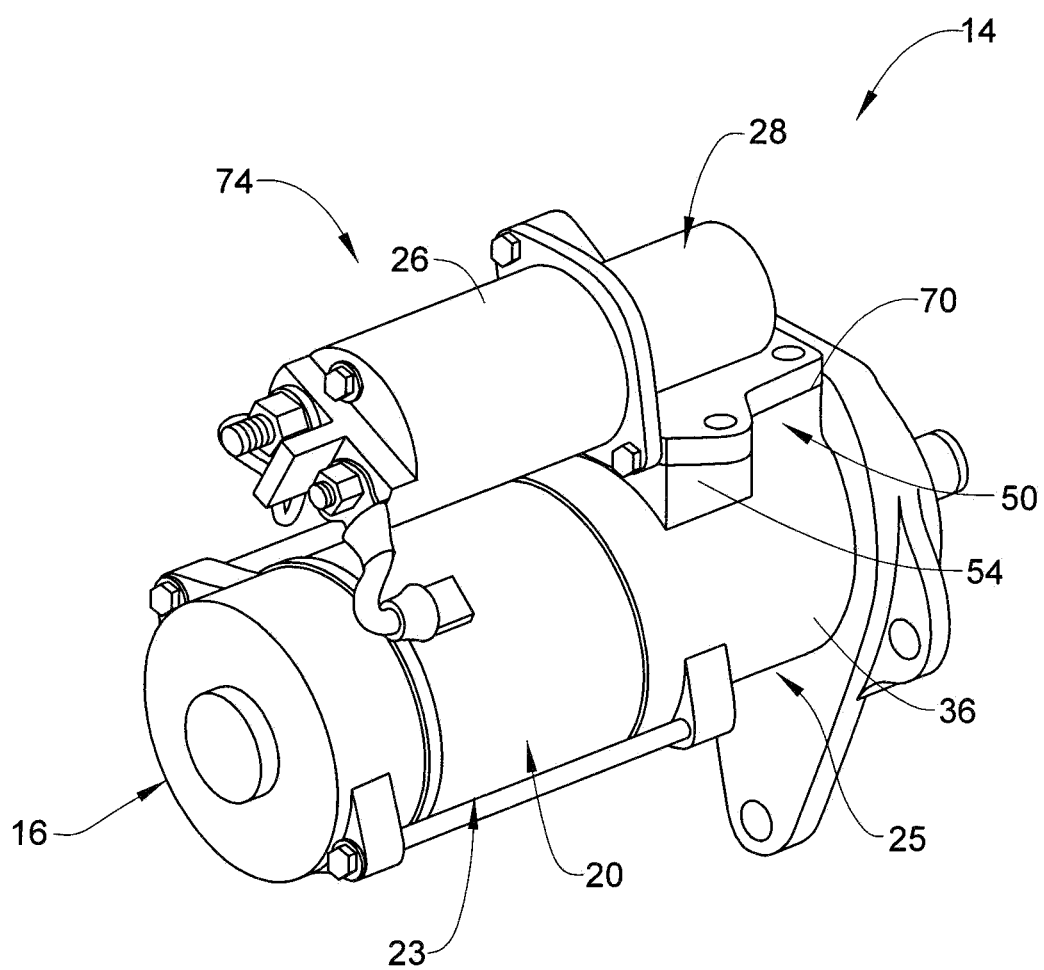
FIG. 2 depicts a perspective view of the motor starter of FIG. 1.
Figure 3:
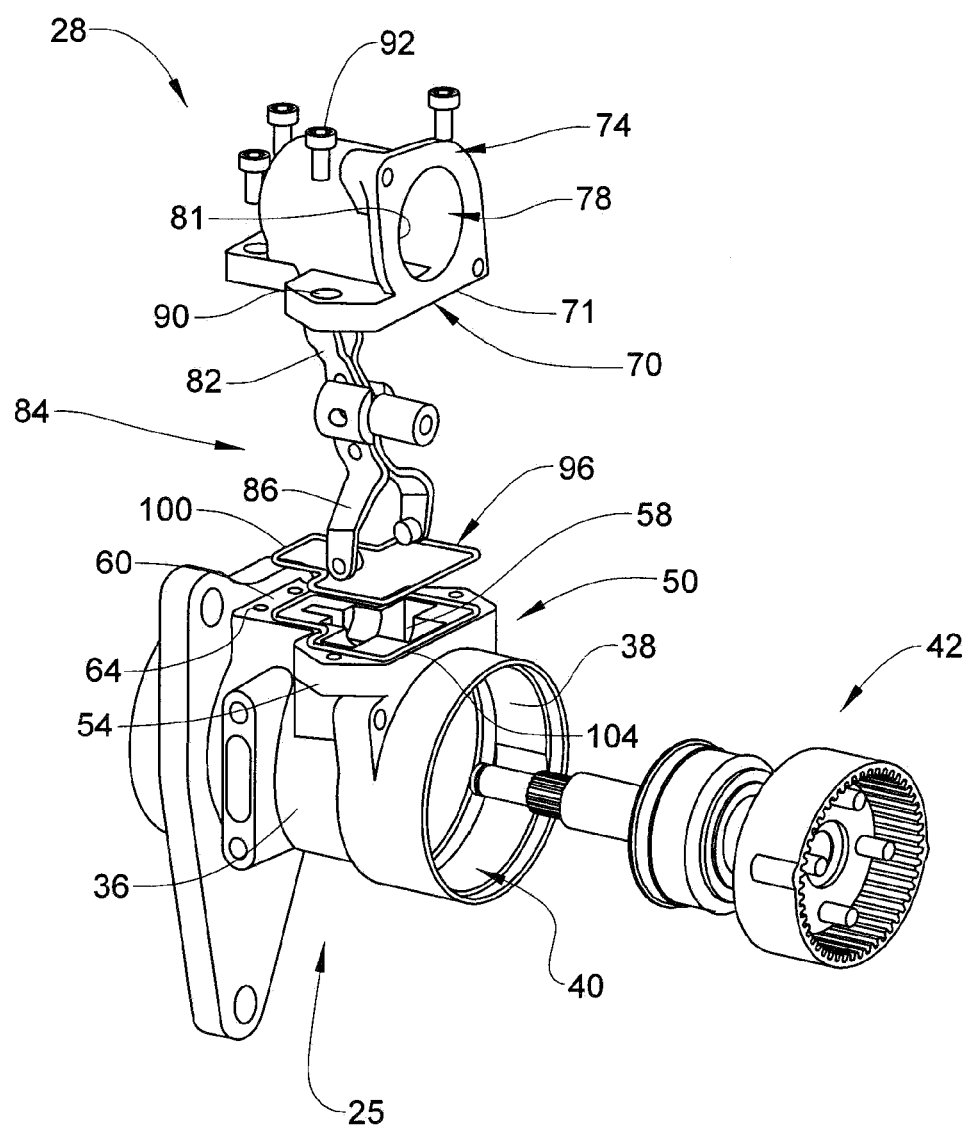
FIG. 3 depicts a partially exploded view of the motor starter of FIG. 2 depicting a gear portion having a solenoid mounting section and a solenoid tower, in accordance with an exemplary embodiment.
Figure 4:
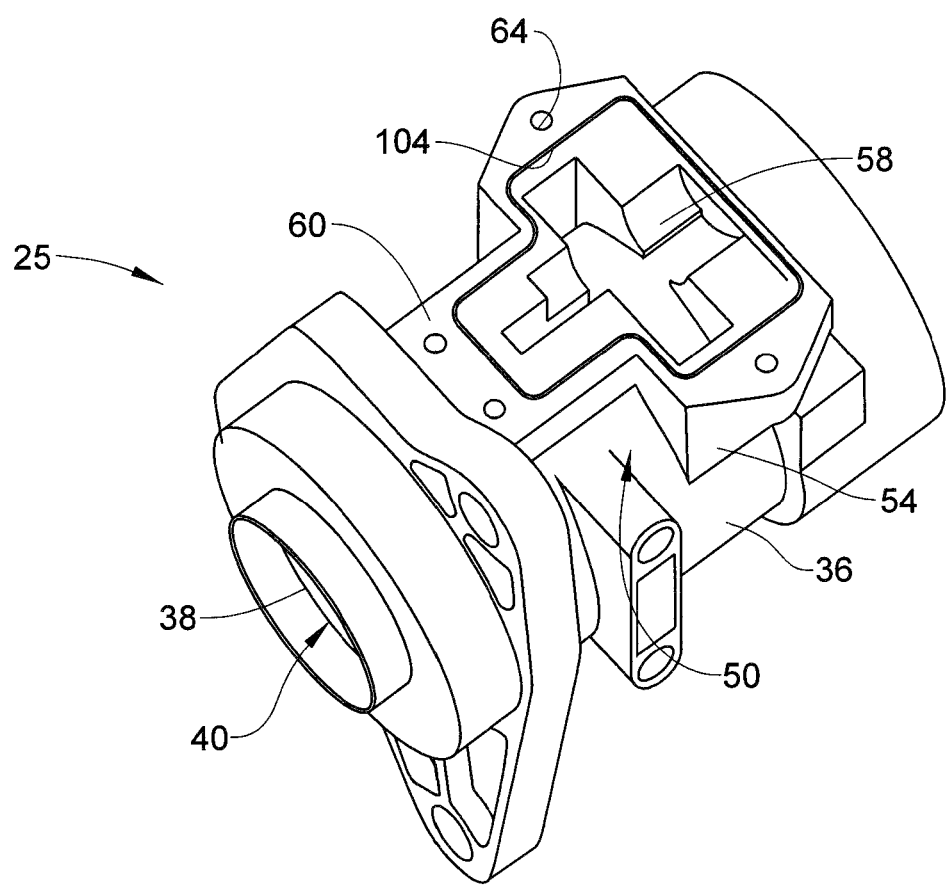
FIG. 4 depicts a perspective view of the gear portion of FIG. 3.
Figure 5:
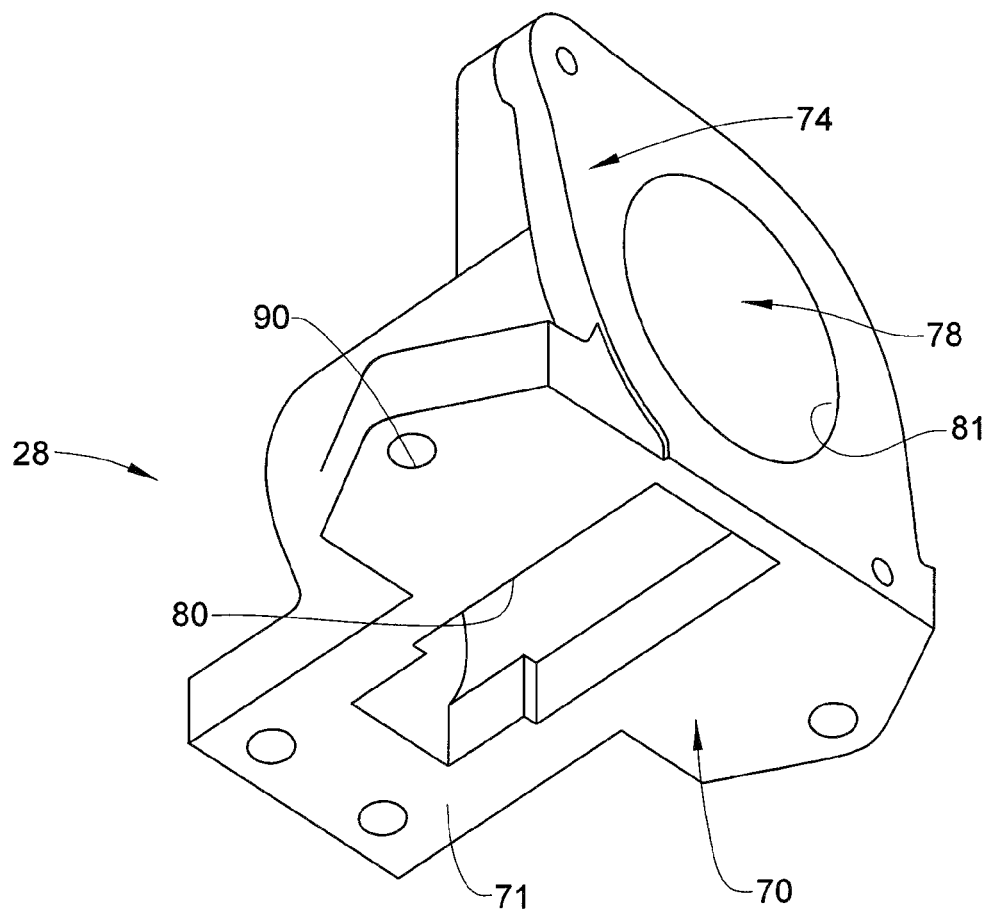
FIG. 5 depicts a perspective view of the solenoid tower of FIG. 3.
Figure 6:
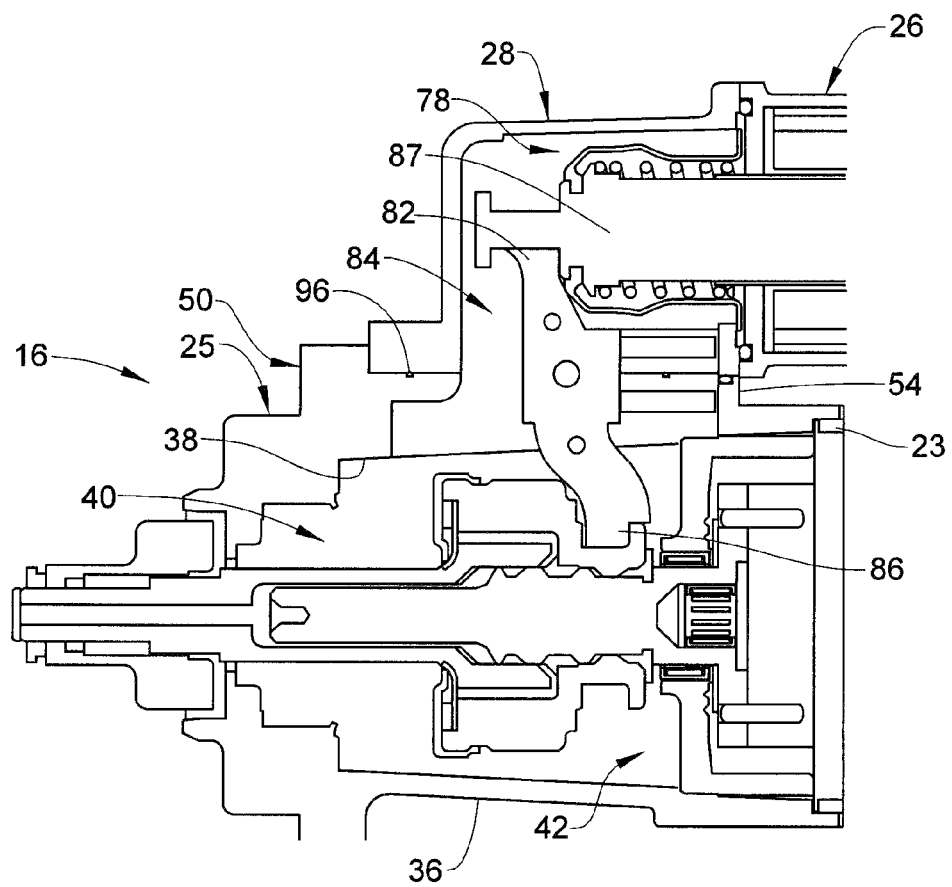
FIG. 6 depicts a partial cross-sectional side view of the motor starter of FIG. 2.

FIG. 1 illustrates a motor vehicle 2 including a body 4 having an engine compartment 6 and a passenger compartment 8. Engine compartment 6 houses an internal combustion engine 10. In accordance with an exemplary embodiment, internal combustion engine 10 includes an electric machine 14, shown in the form of a motor starter 16. Motor starter 16 is selectively activated to initiate operation of internal combustion engine 10. As shown in FIG. 2, motor starter 16 includes a housing 20 including a motor portion 23 that surrounds an electric motor (not shown) and a gear portion 25. A solenoid 26 is coupled to housing 20 through a solenoid tower 28.

In accordance with an exemplary embodiment and illustrated in FIGS. 3-6, gear portion 25 includes an outer surface 36 and an inner surface 38 that defines an interior zone 40. Interior zone 40 houses a gear assembly 42 that is operatively connected to solenoid 26, as will be detailed more fully below. Gear portion 25 includes a solenoid mounting section 50 having a side wall 54 that projects outwardly of outer surface 36. Solenoid mounting section 50 includes a shift lever opening 58 that is surrounded by a first mating surface 60. First mating surface 60 mates with solenoid tower 28. Solenoid mounting section 50 also includes a plurality of threaded openings, one of which is indicated at 64.

Solenoid tower 28 extends from a first end 70 that defines a second mating surface 71 to a second end 74. Solenoid tower 28 includes an interior portion 78 that leads from a shift lever aperture 80 (FIG. 5) at first end 70 to a solenoid aperture 81 at second end 74. Second mating surface 71 is shaped to interface with first mating surface 60 such that shift lever aperture 80 registers with shift lever opening 58 and solenoid aperture 81 receives solenoid 26. When mounted to gear portion 25, interior portion 78 receives a first end 82 of a shift lever 84. First end 82 is operatively connected to a plunger 87 (FIG. 6) of solenoid tower 28. A second end 86 of shift lever 84 is operatively connected to gear assembly 42. Solenoid tower 28 also includes a plurality of mounting openings, one of which is shown at 90, at first end 70. Mounting openings 90 register with corresponding ones of threaded openings 64 when solenoid tower 28 is positioned on gear portion 25. Mechanical fasteners, one of which is indicated at 92, pass through mounting openings 90 and engage with threaded openings 64 to secure solenoid tower 28 to gear portion 25.

In further accordance with an exemplary embodiment, electric machine 14 includes a seal 96 disposed between first mating surface 60 and second mating surface 71. Seal 96 provides a substantially fluid resistant interface between gear portion 25 and solenoid tower 28. In accordance with an aspect of an exemplary embodiment, seal 96 is shown in the form of an O-ring 100 disposed in a groove 104 formed in first mating surface 60. Of course if should be understood that seal 96 could take on many different forms and geometries. It should also be understood that groove 104 could, in the alternative, be formed in second mating surface 71. Regardless of form, seal 96 eliminates a potential leak point into housing 20.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing including a first end, a second end, and an intermediate portion axially extending between the first and second ends, the intermediate portion including an outer surface and an inner surface defining an interior zone;
   a solenoid mounting section projecting radially outwardly of the outer surface of the housing, the solenoid mounting section including a first mating surface, a shift lever opening that extends from the outer surface through the inner surface, and a plurality of threaded openings arranged about the shift lever openings;
   a solenoid tower mounted to the housing, the solenoid tower extending from a first end detachably coupled to the solenoid mounting section to a second end configured to receive a solenoid, the first end including a second mating surface that interfaces with the first mating surface, an opening that registers with the shift lever opening, and a plurality of mounting openings; and
   a plurality of mechanical fasteners extending through corresponding ones of the plurality of mounting openings and engaging with respective ones of the threaded openings, wherein at least one of the solenoid mounting section and the solenoid tower includes a seal extending about the opening and shift lever opening that substantially eliminates a leak path into the housing between the solenoid tower and the solenoid mounting section.

2. The electric machine according to claim 1, wherein the seal is provided on the solenoid mounting section.

3. The electric machine according to claim 2, wherein the solenoid mounting section includes a groove that surrounds the opening, the seal being provided in the groove.

4. The electric machine according to claim 3, further comprising:
   a plurality of threaded openings formed in the housing outwardly of the groove; and
   a plurality of openings formed in the solenoid tower that registers with the plurality of threaded openings formed in the housing.

5. The electric machine according to claim 1, wherein the housing includes a motor portion and a gear portion, the solenoid mounting section being provided on the gear portion.

6. The electric machine according to claim 1, further comprising: a solenoid mounted to the second end of the solenoid tower.

7. The electric machine according to claim 6, further comprising: a shift lever extending though the shift lever opening in the solenoid mounting section, the shift lever extending from a first end operatively connected to the solenoid to a second end positioned in the interior zone.

8. The electric machine according to claim 7, further comprising: a gear assembly arranged in the interior zone, the second end of the shift lever being operatively connected to the gear assembly.

9. A motor vehicle comprising:
   a body including an engine compartment and a passenger compartment; and
   an internal combustion engine mounted in the engine compartment, the internal combustion engine including a motor starter comprising:
     a housing including a first end, a second end, and an intermediate portion axially extending between the first and second ends, the intermediate portion including an outer surface and an inner surface defining an interior zone;
     a solenoid mounting section projecting radially outwardly of the outer surface of the housing, the solenoid mounting section including a first mating surface, a shift lever opening that extends from the outer surface through the inner surface, and a plurality of threaded openings arranged about the shift lever openings;
     a solenoid tower mounted to the housing, the solenoid tower extending from a first end detachably coupled to the solenoid mounting section to a second end configured to receive a solenoid, the first end including a second mating surface that interfaces with the first mating surface, an opening that registers with the shift lever opening, and a plurality of mounting openings; and
     a plurality of mechanical fasteners extending through corresponding ones of the plurality of mounting openings and engaging with respective ones of the threaded openings, wherein at least one of the solenoid mounting section and the solenoid tower includes a seal extending about the opening and shift lever opening that substantially eliminates a leak path into the housing between the solenoid tower and the solenoid mounting section.

10. The motor vehicle according to claim 9, wherein the solenoid mounting section includes a first mating surface and the first end of the solenoid tower defines a second mating surface abutting the first mating surface, the seal being provided on the first mating surface.

11. The motor vehicle according to claim 10, further comprising: a groove formed in the first mating surface surrounding the opening, the seal being provided in the groove.

12. The motor vehicle according to claim 11, further comprising:
   a plurality of threaded openings formed in the housing outwardly of the groove; and
   a plurality of openings formed in the solenoid tower that register with the plurality of threaded openings formed in the housing.

13. The motor vehicle according to claim 11, wherein the seal comprises an O-ring.

14. The motor vehicle according to claim 9, wherein the housing includes a motor portion and a gear portion, the solenoid mounting section being provided on the gear portion.

15. The motor vehicle according to claim 9, further comprising: a solenoid mounted to the solenoid mounting section.

16. The motor vehicle according to claim 14, further comprising: a shift lever extending though the shift lever opening in the solenoid mounting section, the shift lever extending from a first end operatively connected to the solenoid to a second end operatively connected to a gear assembly arranged in the housing.

\* \* \* \* \*